(12) United States Patent
Rowe

(10) Patent No.: US 11,016,265 B2
(45) Date of Patent: May 25, 2021

(54) MOUNTING ASSEMBLY FOR A MIRROR IN A LASER SCANNING UNIT OF AN IMAGE FORMING DEVICE

(71) Applicant: LEXMARK INTERNATIONAL, INC., Lexington, KY (US)

(72) Inventor: Jason Lee Rowe, Richmond, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 221 days.

(21) Appl. No.: 16/100,735

(22) Filed: Aug. 10, 2018

(65) Prior Publication Data

US 2020/0049943 A1   Feb. 13, 2020

(51) Int. Cl.
*G02B 7/182*   (2021.01)
*G02B 26/12*   (2006.01)

(52) U.S. Cl.
CPC ......... *G02B 7/1821* (2013.01); *G02B 26/125* (2013.01); *G02B 26/121* (2013.01)

(58) Field of Classification Search
CPC .. G02B 7/1821; G02B 26/121; G02B 26/125; G02B 7/18; G02B 7/182; G02B 7/192
See application file for complete search history.

(56) References Cited

U.S. PATENT DOCUMENTS

2018/0231915 A1\* 8/2018 Otoguro ........... G03G 15/04072

\* cited by examiner

*Primary Examiner* — Jack Dinh

(57) ABSTRACT

A mounting assembly for mounting a mirror to a frame in a laser scanning unit of an electrophotographic image forming device includes a bracket attached between the frame and the mirror. The bracket includes a body having a first surface and a second surface transverse to the first surface. A first set of protrusions extends from the first surface for defining a first gap between the frame and the bracket that limits adhesive thickness therebetween when the first surface of the bracket is adhesively attached to the frame. A second set of protrusions extends form the second surface for defining a second gap between the mirror and the bracket that limits adhesive thickness therebetween when the second surface of the bracket is adhesively attached to the mirror.

7 Claims, 3 Drawing Sheets

MOUNTING ASSEMBLY FOR A MIRROR IN A LASER SCANNING UNIT OF AN IMAGE FORMING DEVICE

FIELD OF THE INVENTION

The present disclosure relates to an optical scanning system in an electrophotographic image forming device. It relates further to a mounting assembly for optical components, such as mirrors, in a laser scanning unit of the image forming device.

BACKGROUND

In various imaging devices which utilize light to form images, optical scanning systems are typically employed to scan modulated light beams from one or more light sources onto at least one target surface on which images are to be formed. In an electrophotographic imaging device, for example, an optical scanning system typically includes a scanning mirror which reflects a modulated light beam towards a plurality of optical components. Such optical components may include lenses and mirrors which direct and focus the reflected light beam to form light spots upon a surface of a photosensitive member. As the scanning mirror moves, either in a reciprocating manner as with the case of a torsion oscillator or rotationally as with the case of a polygon mirror, the light beam reflected thereby is scanned across each of the optical components of the optical scanning system. Ultimately, the light beam impinges and is swept across the photosensitive member, which may itself be rotating, as scan lines so as to form latent images thereon.

Optical performance of a scanning system is generally very sensitive to positioning of the optical components. For example, mirrors that direct light beams from the light source to the photosensitive member must be held as accurately as possible to prevent light beam misposition at the photosensitive member. A variety of alignment and positioning techniques exist to provide accurate mirror positioning. Some designs incorporate positional control features that permit precise alignment such as by using mechanical features like screws, cams, or other such devices to allow for tilt angle adjustments to maintain alignment accuracy. While effective, impediments to implementation include additional costs incurred by adding the mechanical features and the time it takes to manually perform adjustments. When no mechanical features are provided for manual positional adjustment, components that position the mirror need to be tooled with high accuracy such that tolerance of its features and accumulated error are within acceptable range of the optical system. However, this requires dimensionally stable plastics and exceptional plastic injection molding which may make it difficult to manufacture optical scanning systems at lower costs.

In other existing configurations, adhesives are used to replace mechanical control features and high-accuracy components for mirror positioning. In one example, mirrors are adhered to the housing by using adhesives at gaps existing between the mirror and the housing. However, this mounting configuration exhibits adhesive thickness variability because it relies on the tolerance stack-up or gaps between mirror and frame to set adhesive thickness. If the gap is too small, the adhesive is not able to flex enough to tolerate the expansion and contraction of components. A larger gap, on the other hand, allows for the expansion and contraction of components but may cause more movement of components and less precise placement of the mirror. The variability of the tolerance gaps makes it difficult to control adhesive thickness and, consequently, the dimensional stability of the mirror and optical performance of the scanning system.

SUMMARY

The foregoing and other are solved by a mirror mounting configuration that utilize mirror brackets provided with features that maintain an ideal gap for adhesives in order to positively control adhesive thickness. In one embodiment, a bracket member for mounting a mirror to a frame of a laser scanning unit in an electrophotographic image forming device includes a body having a first surface and a second surface transverse to the first surface. A first set of protrusions extend from the first surface for defining a first gap between the frame and the bracket member that limits adhesive thickness therebetween when the first surface of the bracket member is adhesively attached to the frame. A second set of protrusions extend form the second surface for defining a second gap between the mirror and the bracket member that limits adhesive thickness therebetween when the second surface of the bracket member is adhesively attached to the mirror. In other embodiments, the first set of protrusions extend at an equal height from the first surface. The second set of protrusions extend at an equal height from the second surface.

In another embodiment, a mounting assembly for mounting a mirror to a frame in a laser scanning unit of an electrophotographic image forming device includes a bracket attached between the frame and the mirror. The bracket has a first surface with a first set of protrusions extending from the first surface and contacting against the frame to define a first gap between the frame and the first surface of the bracket. The bracket also has a second surface with a second set of protrusions extending from the second surface and contacting against the mirror to define a second gap between the mirror and the second surface of the bracket. A first adhesive in the first gap fixedly attaches the bracket to the frame. A second adhesive in the second gap fixedly attaches the bracket to the mirror. The first and second adhesives conform to the first and second gaps, respectively, upon curing.

In another embodiment, a laser scanning unit for an electrophotographic image forming device includes a frame and a scanning member positioned within the frame and having at least one reflective surface for reflecting light incident thereon. A light source emits a light beam to be incident on the at least one reflective surface of the scanning member during a scanning operation, and a mirror deflects the light beam from the scanning member to a photosensitive surface. At each opposite side of the frame, a bracket is adhesively attached between the mirror and the frame to mount the mirror to the frame. The bracket has a first surface with a first set of protrusions extending from the first surface and contacting against the frame to define a first gap between the frame and the first surface of the bracket that limits adhesive thickness therebetween. The bracket also has a second surface with a second set of protrusions extending from the second surface and contacting against the mirror to define a second gap between the mirror and the second surface of the bracket that limits adhesive thickness therebetween.

DETAILED DESCRIPTION OF THE ILLUSTRATED EMBODIMENTS

Figure 1:
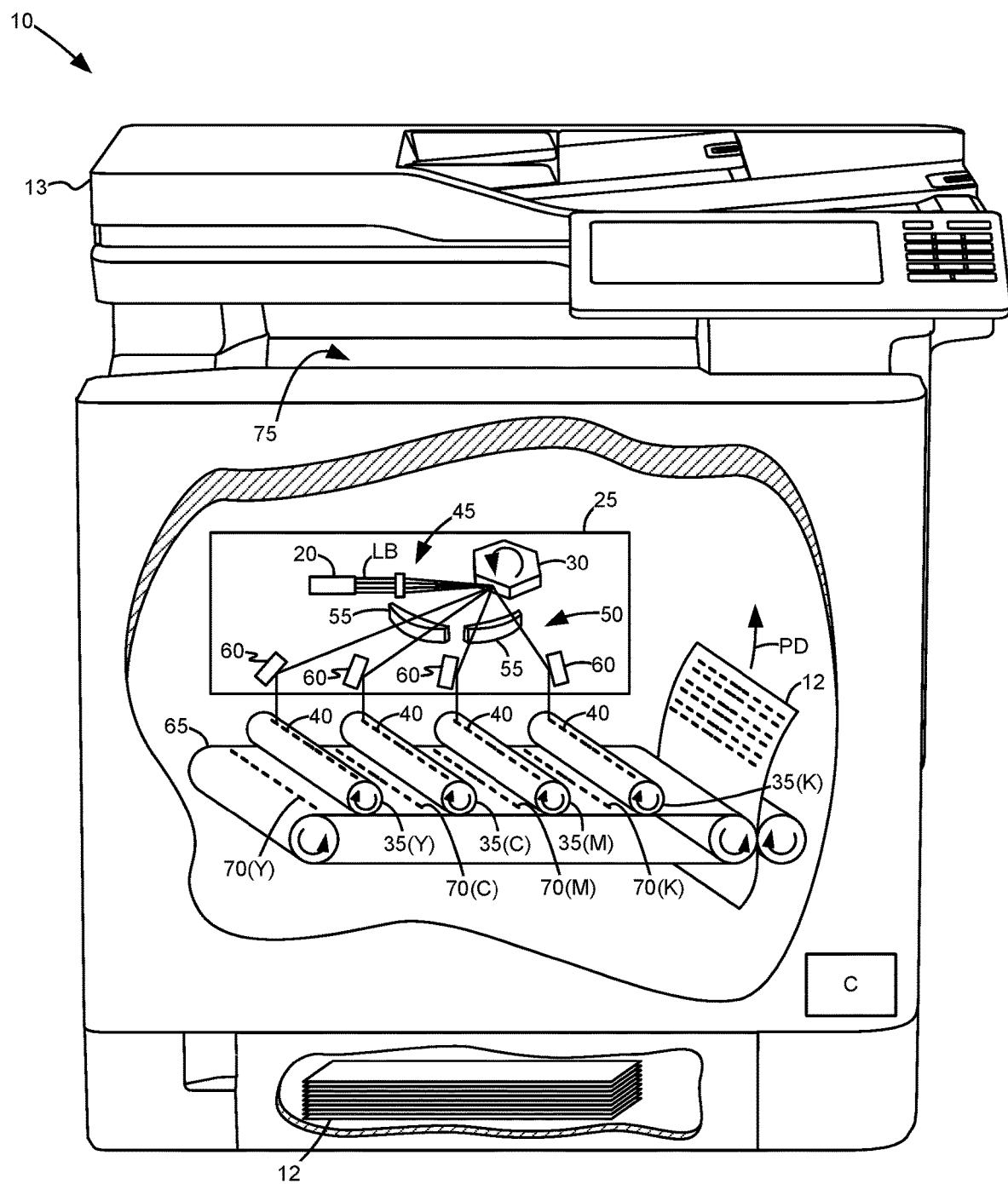
FIG. 1 is a diagrammatic view of an imaging device, including cutaway with a diagrammatic view of a laser scanning unit.

With reference to FIG. 1, a color electrophotographic imaging device 10 is shown according to an example embodiment. Imaging device 10 is used for printing images on media 12. Image data of the image to be printed on the media is supplied to imaging device 10 from a variety of sources such as a scanner 13, computer, laptop, mobile device, or like computing device. The sources directly or indirectly communicate with imaging device 10 via wired and/or wireless connection. A controller (C), such as an ASIC(s), circuit(s), microprocessor(s), etc., receives the image data and controls hardware of imaging device 10 to convert the image data to printed data on the sheets of media 12.

During use, controller (C) controls one or more laser or light sources 20 in a laser scanning unit (LSU) 25 to produce modulated laser beams LB directed at a scanning mechanism, such as a polygon mirror 30. As the polygon mirror 30 rotates, laser beams LB are reflectively scanned to discharge areas of corresponding photoconductive (PC) drums 35 for each color plane (Y), (C), (M) and (K), and create latent images 40 of the image data thereon. Pre-scan optics 45 and post-scan optics 50 in LSU 25 include lenses and mirrors that transform and direct laser beams LB from light source 20 to PC drums 35. For post-scan optics 50, lenses 55 serve to focus scanned laser beams LB into small spot sizes on corresponding PC drums 35 while mirrors 60 direct laser beams LB scanned by polygon mirror 30 toward respective PC drums 35. Downstream of the latent images 40 on PC drums 35, the printed image is formed by applying toner particles to the latent images 40 using developer units (not shown) and transferring toned image 70 from each PC drum 35 to a transfer belt 65 which then transports the toned images 70 for transfer to a media sheet 12 travelling in a process direction PD. The media sheet 12 with the toned image enters a fuser (not shown) which applies heat and pressure to the media sheet 12 in order to fuse the toned image thereto. Ultimately, the media sheet 12 is either deposited into an output media area 75 or enters a duplex media path for imaging on the other side of the media sheet 12.

Precise alignment between optical components of the LSU is necessary to ensure high print quality. That is, if optical components are well aligned, the printed image corresponds nearly exactly with the image data. If not, the printed image can have poor quality, especially in the form of misalignments. Accurate positioning of the mirrors, for example, is one of the variables that controls the registration of laser beams on the PC drum which directly affects print quality. If mirrors are skewed relative to their ideal positions in the LSU housing, they tend to misposition laser beams at the PC drums. Thus, it is important that mirrors 60 be held as accurately as possible at their desired and/or ideal positions in order to prevent, if not eliminate, laser beam mispositions at PC drums 35.

Figure 2:
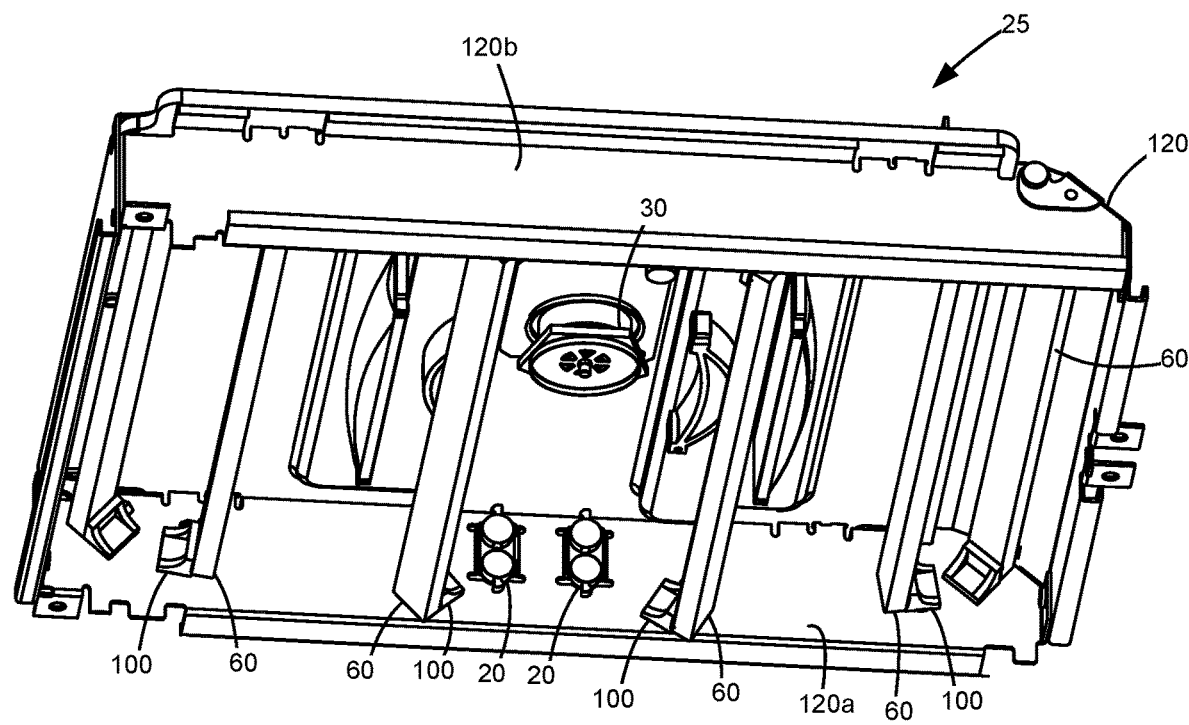
FIG. 2 is a perspective view of a laser scanning unit employing brackets to hold and position mirrors according to an example embodiment.

To achieve alignment accuracy of mirrors 60, a configuration for mounting mirrors 60 in LSU 25 includes the use of brackets 100 that adhesively hold mirrors 60 against their respective datums in LSU 25 as illustrated in FIG. 2. Brackets 100 are provided on opposite sides 120a, 120b of a frame 120 to fixedly attach opposite ends of mirror 60 to frame 120 so that mirrors 60 are positioned to direct laser beams emitted by light sources 20 and scanned by polygon mirror 30 to corresponding PC drums in the imaging device. In this example embodiment, each mirror 60 attaches to frame 120 without applying adhesives directly between mirror 60 and frame 120. Instead, each bracket 100 serves as an intermediate component for adhesively attaching mirror 60 to frame 120, eliminating tolerance stack-ups between frame 120 and mirror 60 while positioning mirrors 60 near or at ideal positions. Accordingly, providing brackets 100 as intermediate members for securing mirror 60 to frame 120 avoids having to rely on tolerance gaps immediately between mirror 60 and frame 120 for adhesive placement and mirror positioning.

Further, each bracket 100 includes features that allow for tight control of gaps or spaces intended for adhesives to fill in during bracket adhesion between mirror 60 and frame 120 so as to control adhesive thickness. That is, the gaps are controlled so that the gap sizes and, consequently, the adhesives that fill the gaps are neither too small nor too large when brackets 100 are adhered between mirror 60 and frame 120. If the gap is too small, the adhesives in the gaps may not be able to flex enough to tolerate the expansion and contraction of components attached to the adhesives. The adhesives may break due to high stress and cause mirror 60 to detach from frame 120 as a result. On the other hand, if the gap is too large, there is more variability in how the adhesives cure within the gap which causes larger internal stresses in the adhesives and movement of components attached to the adhesive. As a result, larger gaps may tend to allow more movement of the mirror which causes less precise placement of the mirror and less robustness to vibration and shock. In an example embodiment, each bracket 100 provides predetermined gap sizes for adhesives that are large enough to prevent adhesive failure due to expansion and contraction of LSU components but small enough to aid precision holding of the mirror, as discussed in greater detail below.

Figure 3A:
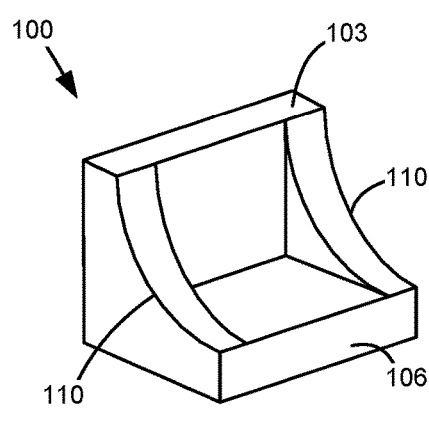
FIGS. 3A and 3B are perspective views of the bracket in FIG. 2 according to an example embodiment.
Figure 3B:
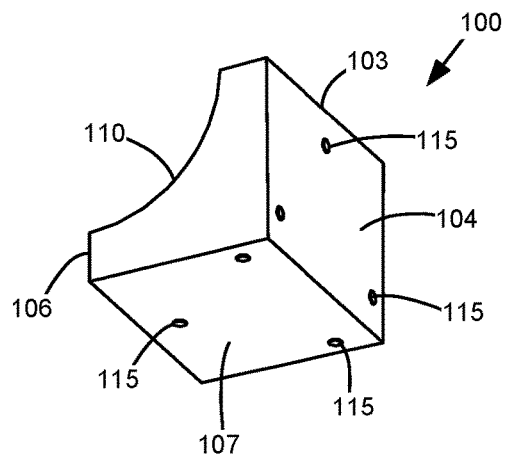

With reference to FIGS. 3A and 3B, bracket 100 has a body including angled arms 103, 106 having a first surface 104 and a second surface 107, respectively, shown as planar transverse surfaces. In this example, the first and second surfaces 104, 107 are substantially perpendicular to each other. When mounting a mirror to the frame, first surface 104 of bracket 100 interfaces with the frame and second surface 107 interfaces with the mirror by way of adhesives. Opposed gussets 110 extend between the free ends of arms 103, 106 for added strength and rigidity. In one embodiment, bracket 100 is made of polycarbonate plastic material. On each of the first surface 104 and second surface face 107, a plurality of posts or protrusions 115 extend at an equal height to control adhesive thickness between the frame, bracket 100 and the mirror when the mirror is mounted to the frame using bracket 100. Three protrusions 115 are shown on each surface 104, 107 arranged in a triangular fashion, but any number of protrusions 115 may be provided and arranged in other manner either irregularly or regularly. In one example form, bracket 100 and its protrusions 115 are formed as a single molded piece.

The height of each protrusion 115 is selected to provide a first gap between the frame and bracket 100 and a second gap between bracket 100 and the mirror that allow adhesives within the gaps to exhibit thicknesses that hold the mirror both accurately and precisely while allowing the adhesives to be robust in responding to changes in the surrounding environment. The gaps are set or predetermined to meet certain requirements of LSU operation, such as the temperature range of operation and/or the desired maximum movement of the mirror. For example, the gap sizes, and thus the height of each protrusion 115, is selected depending on the material properties of the LSU components such as the coefficient of thermal expansion and thermal conductivity of the adhesive, bracket, frame, and/or mirror, and the response across various environmental and/or LSU conditions such as changes in temperature and humidity, vibration and shock. These and other measurements and/or parameters may be obtained empirically by performing tests and measurements on the use of bracket 100 in LSU 25. Depending on desired requirements, the height of protrusions 115 on first surface 104 may or may not have the same height as the protrusions 115 on second surface 107.

Figure 4A:
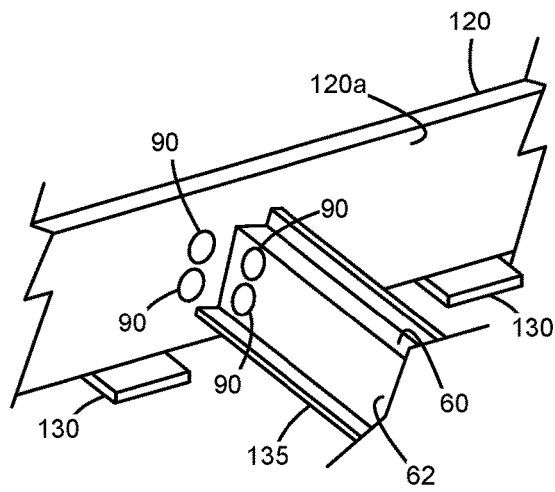
FIGS. 4A and 4B are perspective views illustrating mounting of the bracket between mirror and frame using adhesives according to an example embodiment.
Figure 4B:
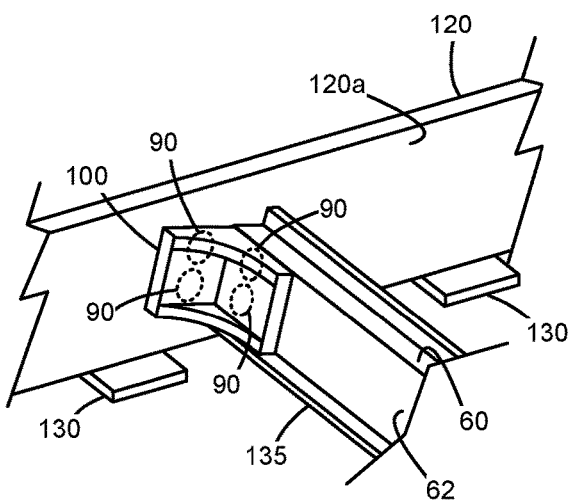
Figure 5:
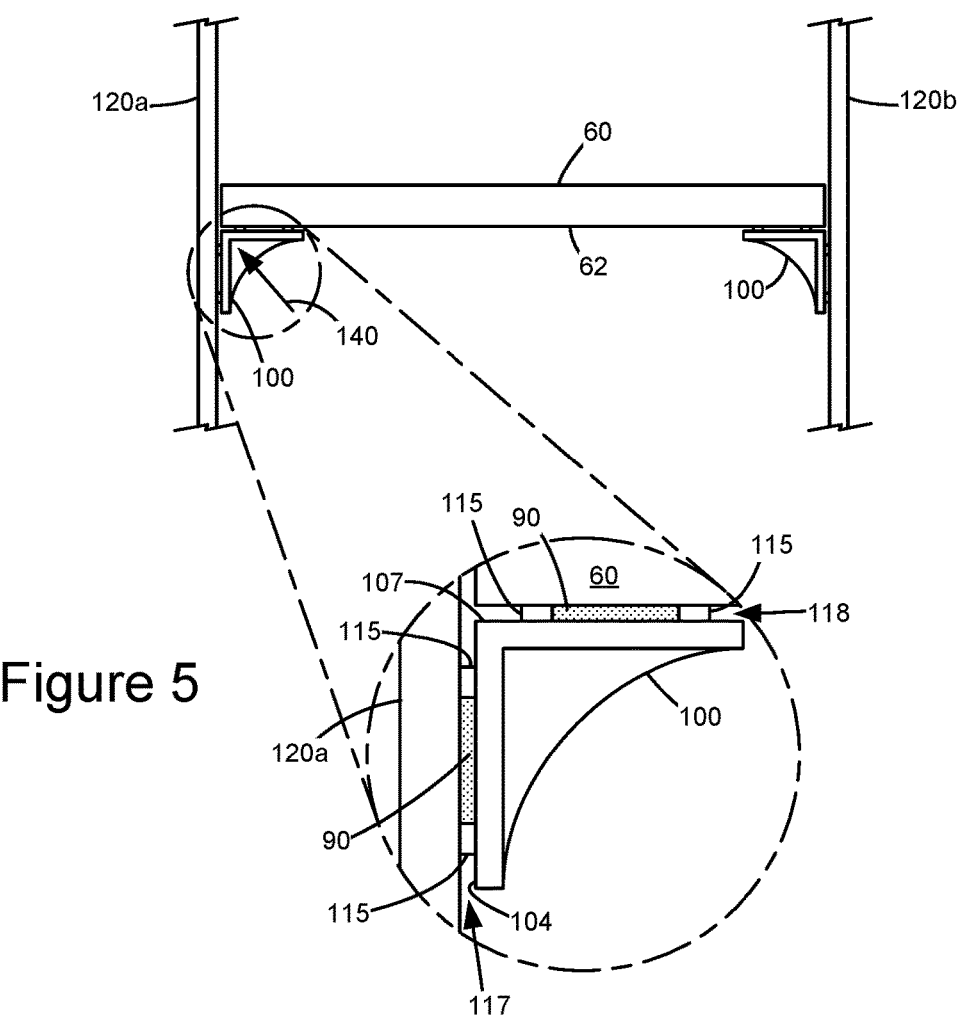
FIG. 5 is a top view illustrating the bracket adhesively attached between the frame and the mirror.

In a further embodiment, mirrors 60 are adhered to frame 120 via brackets 100 using assembly line fixtures during production. For example, in FIGS. 4A, 4B and 5, frame 120 and mirrors 60 are placed on an assembly fixture having alignment surfaces 130, 135 that respectively locate frame 120 and mirrors 60 near or at their ideal positions. Adhesives 90 are applied to side 120a of frame 120 and a backside 62 of mirror 60 at locations where bracket 100 interfaces with frame 120 and mirror 60. Before the adhesives 90 are cured, bracket 100 is positioned at its datum and is pressed using a biasing force 140 to push the bracket 100 against its datum as shown in FIGS. 4B and 5. Biasing force 140 is shown as a pressing force angled at about 45° relative to the first and second surfaces 104, 107 of bracket 100 that attaches both surfaces 104, 107 to frame 120 and mirror 60, respectively, at substantially the same time. It is noted, however, that other forces may be used to facilitate attachment of bracket 100 between frame 120 and mirror 60 in other embodiments.

Protrusions 115 on bracket 100 contact against side 120a of frame 120 and the backside 62 of mirror 60 defining a first gap 117 between frame 120 and bracket 100 and a second gap 118 between bracket 100 and mirror 60 while adhesives 90 are pressed within respective first and second gaps 117, 118. In one example, each of the first gap 117 and second gap 118 may range between about 0.025 mm and about 0.75 mm. A similar procedure is performed at the opposite side of mirror 60 and frame 120. At this point, adhesives 90 spread across the respective gaps 117, 118 and are then cured forming adhesive layers at the interfaces between bracket 100, frame 120, and mirror 60 with each adhesive layer having a thickness defined by the height of protrusions 115. Different techniques for curing adhesives 90 may be used such as, for example, ultraviolet (UV) curing, heat curing, and moisture curing. Once cured, adhesives 90 fill the gaps between frame 120, bracket 100 and mirror 60, eliminating tolerance stack-ups between mirror 60 and frame 120 while positioning mirror 60 at its desired position.

Other alternatives for adhesion may include the use a low viscosity liquid adhesive applied between the interface points of bracket 100, frame, and mirror 60 before curing. The bracket may be made of a transparent or translucent material to allow for the curing of the bracket to the mirrored face of the mirror, such as when adhesives cannot be cured because of the mirrored surface. In this example, curing of the adhesive can take place through the transparent or translucent bracket and/or at the time of applying the biasing force 140. Further, the bracket surfaces 104, 107 may include pockets to aid adhesive flow within the gaps, such as when higher viscosity adhesives are used.

By having protrusions 115 on bracket 100 that set the adhesive gap thickness, adhesive thickness is no longer reliant on the tolerance gaps between frame 120 and mirror 60 that tend to have high variability from a unit to unit perspective. Tight gap control to aid precision holding of the mirror is balanced with the need to have a large enough gap to prevent failure due to expansion and contraction. In addition, by using brackets 100, accurate positioning of the mirrors may be achieved without the need of additional mounting hardware or mechanical features providing manual positional adjustment which not only reduces complexity but also allows manufacture of LSUs at lower costs.

The foregoing illustrates various aspects of the invention. It is not intended to be exhaustive. Rather, it is chosen to provide the best mode of the principles of operation and practical application known to the inventors so one skilled in the art can practice it without undue experimentation. All modifications and variations are contemplated within the scope of the invention as determined by the appended claims. Relatively apparent modifications include combining one or more features of one embodiment with those of another embodiment.

The invention claimed is:

1. A laser scanning unit for an electrophotographic image forming device, comprising:
    a frame;
    a scanning member positioned within the frame and having at least one reflective surface for reflecting light incident thereon;
    a light source for emitting a light beam to be incident on the at least one reflective surface of the scanning member during a scanning operation;
    a mirror for deflecting the light beam from the scanning member to a photosensitive surface; and
    at each opposite side of the frame, a bracket adhesively attached between the mirror and the frame to mount the mirror to the frame, the bracket having a first surface with a first set of protrusions extending from the first surface and each protrusion of the first set of protrusions contacting against the frame to define a first gap between the frame and the first surface of the bracket that limits adhesive thickness therebetween, and a second surface with a second set of protrusions extending from the second surface and each protrusion of the second set of protrusions contacting against the mirror to define a second gap between the mirror and the second surface of the bracket that limits adhesive thickness therebetween.

2. The laser scanning unit of claim 1, wherein the first and second surfaces of the bracket are planar surfaces.

3. The laser scanning unit of claim 1, wherein the first and second surfaces of the bracket are transverse relative to each other.

4. The laser scanning unit of claim 1, wherein the first and second surfaces of the bracket are perpendicular to each other.

5. The laser scanning unit of claim 1, wherein each of the first and second sets of protrusions includes at least three protrusions.

6. The laser scanning unit of claim 1, wherein the first set of protrusions extends at an equal height from the first surface.

7. The laser scanning unit of claim 1, wherein the second set of protrusions extends at an equal height from the second surface.

\* \* \* \* \*